US011268880B1

(12) United States Patent
He et al.

(10) Patent No.: US 11,268,880 B1
(45) Date of Patent: Mar. 8, 2022

(54) METHOD OF DETECTING THE CLEANLINESS OF A LENS USING DIFFERENTIAL FLAT FIELD CORRECTION OF PUPIL INCIDENCE

(71) Applicant: MLOptic Corp, Redmond, WA (US)

(72) Inventors: Jiang He, Hangzhou (CN); Teresa Zhang, Albany, NY (US); Wei Zhou, Sammamish, WA (US); Weida Liu, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/485,264

(22) Filed: Sep. 24, 2021

(30) Foreign Application Priority Data

Sep. 27, 2020 (CN) .......................... 2020110299829

(51) Int. Cl.
*G02B 21/16* (2006.01)
*G01M 11/02* (2006.01)
*G06T 5/50* (2006.01)
*H04N 5/225* (2006.01)

(52) U.S. Cl.
CPC .......... *G01M 11/0257* (2013.01); *G06T 5/50* (2013.01); *H04N 5/2256* (2013.01); *G06T 2207/30108* (2013.01)

(58) Field of Classification Search
CPC .................. G01M 11/0257; G06T 5/50; G06T 2207/30108; H04N 5/2256; G03F 7/7065; G03F 7/70608; G03F 7/70566; G03F 7/70575
See application file for complete search history.

(56) References Cited

U.S. PATENT DOCUMENTS

2011/0064296 A1* 3/2011 Dixon .................... G02B 21/16
382/133

* cited by examiner

*Primary Examiner* — Patrick E Demosky
(74) *Attorney, Agent, or Firm* — Tracy Jong Law Firm; Tracy P. Jong; Cheng Ning Jong

(57) ABSTRACT

A method for detecting lens cleanliness of a lens in a flat-field optical path, the flat-field optical path includes a light source, the lens, a camera, the light source is a narrow-band multispectral uniform surface light source, the camera's light-sensitive surface is disposed perpendicular to an optical axis of the lens and in the light position of the lens and a pupil interposed between the lens and the light source, the method including collecting the bright-field image data and dark-field image data for a plurality of pupil aperture sizes through the lens; for each pixel, performing a pupil differential flat field correction to yield a plurality of PiPj pupil differentials; and displaying the pupil differentials in the form of a plurality of images to show uniformity of each image, wherein a non-uniform area on each image is determined to have been caused by an impurity of the lens.

3 Claims, 3 Drawing Sheets

|            | Pupil P1          | Pupil P2          | Pupil P3          | Pupil P4          | ... | Pupil PN          |
|------------|-------------------|-------------------|-------------------|-------------------|-----|-------------------|
| Pupil P1   | Empty             | P1P2 Differential | P1P3 Differential | P1P4 Differential | ... | P1PN Differential |
| Pupil P2   | P2P1 Differential | Empty             | P2P3 Differential | P2P4 Differential | ... | P2PN Differential |
| Pupil P3   | P3P1 Differential | P3P2 Differential | Empty             | P3P4 Differential | ... | P3PN Differential |
| Pupil P4   | P4P1 Differential | P4P2 Differential | P4P3 Differential | Empty             | ... | P4PN Differential |
| ...        | ...               | ...               | ...               | ...               | Empty | ...             |
| Pupil PN   | PNP1 Differential | PNP2 Differential | PNP3 Differential | PNP4 Differential | ... | Empty             |

AA Blank     AB Differential     AC Differential

BA Differential     BB Blank     BC Differential

CA Differential     CB Differential     CC Blank

A Original Image     B Original Image     C Original Image

| | Pupil P1 | Pupil P2 | Pupil P3 | Pupil P4 | ... | Pupil PN |
|---|---|---|---|---|---|---|
| Pupil P1 | Empty | P1P2 Differential | P1P3 Differential | P1P4 Differential | ... | P1PN Differential |
| Pupil P2 | P2P1 Differential | Empty | P2P3 Differential | P2P4 Differential | ... | P2PN Differential |
| Pupil P3 | P3P1 Differential | P3P2 Differential | Empty | P3P4 Differential | ... | P3PN Differential |
| Pupil P4 | P4P1 Differential | P4P2 Differential | P4P3 Differential | Empty | ... | P4PN Differential |
| ... | ... | ... | ... | ... | Empty | ... |
| Pupil PN | PNP1 Differential | PNP2 Differential | PNP3 Differential | PNP4 Differential | ... | Empty |

*FIG. 3*

METHOD OF DETECTING THE CLEANLINESS OF A LENS USING DIFFERENTIAL FLAT FIELD CORRECTION OF PUPIL INCIDENCE

PRIORITY CLAIM AND RELATED APPLICATIONS

This non-provisional application claims the benefit of priority from Chinese Pat. App. No. 2020110299829 filed on Sep. 27, 2020. Said application is incorporated by reference in its entirety.

BACKGROUND OF THE INVENTION

1. The Field of the Invention

The present invention relates to a lens inspection method. More specifically, the present invention is directed to a method for detecting lens cleanliness using differential flat field correction of a pupil.

2. Background Art

Cleanliness is an important indicator of an imaging system and cleanliness is directly related to stray light, ghosting, uniformity and other key imaging factors. In a lens manufacturing process, the generation of surface defects is often unavoidable. In general, surface defects are local physical or chemical properties of product surface uneven areas, such as inclusions, damage, stains, etc., all having adverse impacts on the cleanliness of the product. Therefore, a lens manufacturer attaches great importance to lens cleanliness inspection, through timely discovery of surface defects of the lens, effective control of product quality, further analysis and solution of problems in the production process, thereby eliminating or reducing the generation of defective products.

Finished lens are predominantly visually inspected. Such method of inspection yields a low sampling rate and accuracy, is real-time poor, inefficient and labor-intensive. These shortcomings are further exacerbated by inspectors' work experience and skills while machine vision-based inspection methods can largely overcome the shortcomings.

Machine vision can be utilized in non-contact and non-destructive automatic inspections, therefore making it an effective means to achieve equipment automation, intelligence and precision control, with advantages in safety, reliability, wide spectral response ranges, reduction of long working hours in harsh environments and high productivity. Machine vision includes an image analysis module, a data management module and a human-machine interface module. An image acquisition module can include a charge-coupled device (CCD) camera, an optical lens, a light source and its clamping device, etc. Its function is to complete the acquisition of images of a product surface. Under the illumination of a light source, a surface of a product is imaged on the camera sensor through an optical lens and the light signal obtained of the surface of the product is converted into an electrical signal, which is then converted into a digital signal that can be processed by a computer. Currently, industrial cameras are mainly based on CCD or complementary metal oxide semiconductor (CMOS) chip technology. CCD is currently the most commonly used image sensor for machine vision. A light source directly affects image quality and its role is to overcome ambient light interference, to ensure image stability and result in images with the highest possible contrast. Currently used light sources are halogen lamps, fluorescent lamps and light-emitting diode (LED). An LED light source is beneficial as it comes in a small form factor, is low in power consumption, is fast in response time, is a good light-emitting monochrome, is highly reliable, is a uniform and stable light, is easy to integrate and is applicable to a wide range of applications.

Illumination systems composed of light sources can be divided into bright-field and dark-field illumination, structured light illumination and stroboscopic illumination according to their illumination methods. Since the bright-field signal itself carries information about the relative illuminance of the large-angle field of view, it can have a non-negligible effect on imaging. However, the manner in which the influence of a low relative illuminance of a large-angle field of view is suppressed, the manner in which the observable range of the impurity to be detected is amplified and the manner in which the detection efficiency of impurity is effectively improved, are the emphases of current researches in the field of lens inspection.

SUMMARY OF THE INVENTION

In accordance with the present invention, there is provided a method for detecting lens cleanliness of a lens in a flat-field optical path, the flat-field optical path including a light source, the lens, a camera, the light source is a narrow-band multispectral uniform surface light source, the camera's light-sensitive surface is disposed perpendicular to an optical axis of the lens and in the light position of the lens and a pupil interposed between the lens and the light source, the method including:

(a) collecting the bright-field image data and dark-field image data for a plurality of pupil aperture sizes through the lens;

(b) for each pixel, performing a pupil differential flat field correction to yield a plurality of PiPj pupil differentials, wherein a PiPj pupil differential=(pupil Pi bright-field image data−pupil Pi dark-field image data)/(pupil Pj bright-field image data−pupil Pj dark-field image data) and Pi and Pj are two different pupils, i is an index ranging from 1 to N, j is an index ranging from 1 to N and N is the number of pupils; and (c) displaying the pupil differentials in the form of a plurality of images to show uniformity of each of the plurality of the images, wherein a non-uniform area on each image is determined to have been caused by an impurity of the lens.

In one embodiment, the P is 3; pupil P1 aperture size is 3 mm; pupil P2 aperture size is 5 mm; pupil P3 aperture size is 6 mm; P1P2 pupil differential=(bright-field image data for pupil P1−dark-field image data for pupil P1)/(bright-field image data for pupil P2−dark-field image data for pupil P2); P1P3 pupil differential=(bright-field image data for pupil P1−dark-field image data for pupil P1)/(bright-field image data for pupil P3−dark-field image data for pupil P3); P2P1 pupil differential=(bright-field image data for pupil P2−dark-field image data for pupil P2)/(bright-field image data for pupil P1−dark-field image data for pupil P1); P2P3 pupil differential=(bright-field image data for pupil P2−dark-field image data for pupil P2)/(bright-field image data for pupil P3−dark-field image data for pupil P3); P3P1 pupil differential=(bright-field image data for pupil P3−dark-field image data for pupil P3)/(bright-field image data for pupil P1−dark-field image data for pupil P1); and P3P2 pupil differential=(bright-field image data for pupil P3−dark-field image data for pupil P3)/(bright-field image data for pupil P2−dark-field image data for pupil P2).

In one embodiment, the plurality of images includes six images including the P1P2 pupil differential, the P1P3 pupil differential, the P2P1 pupil differential, the P2P3 pupil differential, the P3P1 pupil differential and the P3P2 pupil differential.

An object of the present invention is to provide a method for detecting lens cleanliness using pupil differential flat field correction in order to effectively improve the efficiency of impurity detection.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 depicts a combined arrangement of differential flat-field correction of pupils.

PARTS LIST

Figure 1:
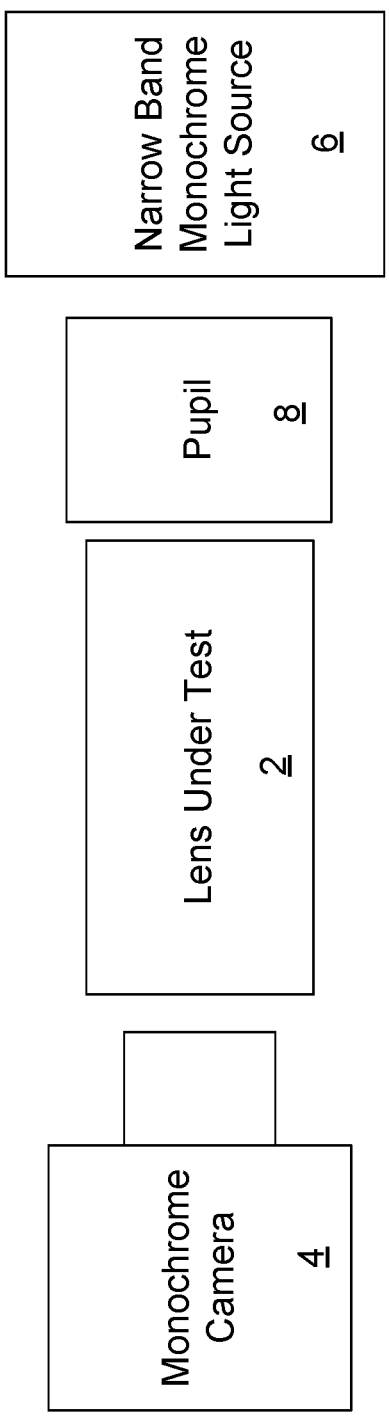
FIG. 1 depicts a test system for the differential flat-field correction of an inferior pupil.
Figure 2:
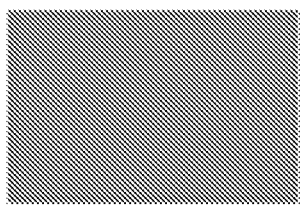
FIG. 2 depicts an image of the differential flat-field correction results for three different pupils.
Figure 2:
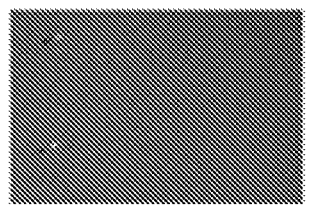
Figure 2:
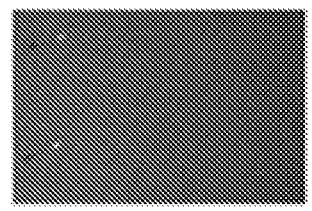
Figure 2:
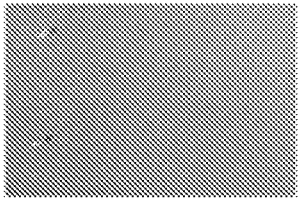
Figure 2:
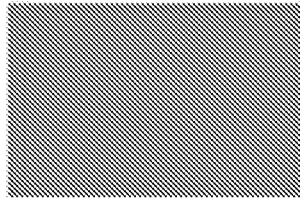
Figure 2:
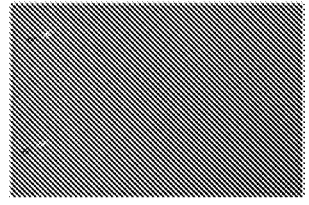
Figure 2:
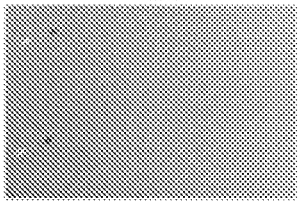
Figure 2:
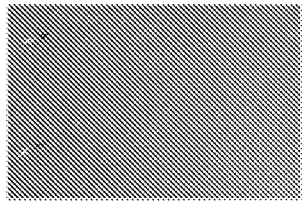
Figure 2:
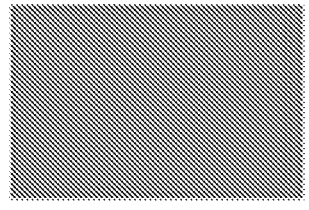
Figure 2:
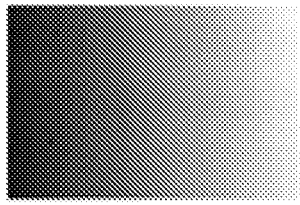
Figure 2:
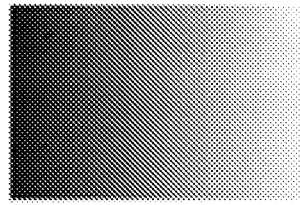
Figure 2:
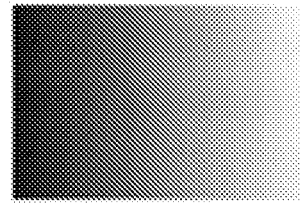

2—lens
4—camera
6—light source
8—pupil

DETAILED DESCRIPTION OF A PREFERRED EMBODIMENT

There is provided a method for detecting lens cleanliness using differential flat-field correction of an input pupil. The method includes first building a flat-field test optical path. The flat-field test optical path includes a light source, a lens to be measured and a monochrome camera. The monochrome camera's light-sensitive surface is placed perpendicular to the lens optical axis of the lens under test and shifted to the light position of the lens to be measured. The light source is a narrow-band uniform surface light source; the bright-field image data is defined as the data collected when the brightest value at the center of the field of view is 80% to 90% of the saturation value, and the dark-field image data is the data collected when there is no signal input; the exposure time is fixed, and the brightness of the light source is adjusted to acquire bright-field and dark-field image data. The method further includes installing a pupil in front of the lens to be measured and measuring the bright-field image data and dark-field image data at different apertures of the pupil. For a plurality of pupils, the dark-field image data at each pupil is measured separately and the bright-field and dark-field image data sets for each pixel at each pupil are obtained. The method further includes performing the pupil-differential flat field correction operation on each pixel where PiPj in pupil differential=(bright-field image data for pupil Pi−dark-field image data for pupil Pi)/(bright-field image data for pupil Pj−dark-field image data for pupil Pj), Pi and Pj are two different kinds of pupils, i is an index ranging from 1 to N, j is an index ranging from 1 to N and N is the number of pupils. In the installing and measuring step, the dark-field image data for different incident pupils are acquired separately. The matrix of each pixel's pupil differential is then displayed in the form of an image for the determination of the lens cleanliness.

The performing step further includes performing the same operation on each pixel, therefore traversing pupil P1, pupil P2, pupil P3, pupil PN−1, and pupil PN. For N pupils, N×(N−1) combinations of pupil differentials are obtained. Preferably, for P1, a small hole with an aperture diameter of 3 mm is used. For P2, a small hole of 5 mm is used, and a small hole of 6 mm is used for P3. P=3 as there are three pupils of different sizes. The aperture size should effectively take advantage of the adjustment range of the light source of the test system. The aperture size should not be too large and it should be evenly distributed within the optional range. The following flat-field correction operation is performed on the bright-field image data and dark-field image data of each pixel for the plurality of pupils and different aperture sizes.

$P1P2$ pupil differential=(bright-field image data for pupil $P1$−dark-field image data for pupil $P1$)/(bright-field image data for pupil $P2$−dark-field image data for pupil $P2$).

$P1P3$ inlet differential=(bright-field image data in $P1$−dark-field image data in $P1$)/(bright-field image data in $P3$−dark-field image data in $P3$).

$P2P1$ pupil differential=(bright-field image data for pupil $P2$−dark-field image data for pupil $P2$)/(bright-field image data for pupil $P1$−dark-field image data for pupil $P1$).

$P2P3$ pupil differential=(bright-field image data for pupil $P2$−dark-field image data for pupil $P2$)/(bright-field image data for pupil $P3$−dark-field image data for pupil $P3$).

$P3P1$ pupil differential=(bright-field image data for pupil $P3$−dark-field image data for pupil $P3$)/(bright-field image data for pupil $P1$−dark-field image data for pupil $P1$).

$P3P2$ pupil differential=(bright-field image data for pupil $P3$−dark-field image data for pupil $P3$)/(bright-field image data for pupil $P2$−dark-field image data for pupil $P2$).

The six pupil differentials are displayed in the form of six images for the determination of lens cleanliness.

Compared to existing technology, the invention has the following significant effects: As only the position of the sensor surface of the camera is shifted during the measurement process, the method is easy to be carried out. There are few pre-conditions applicable to a limited number of test equipment. The influence of low relative illumination of the large-angle field of view is suppressed. The signal-to-noise ratio of the large field of view range is improved. Edge enhancement of impurity imaging is obtained. The imaging offset of different pupils in the CCD has a definite pattern. After offsetting an impurity relative to the optical center into symmetrical distributions with differential impurity imaging, observable patterns of the impurity are then unified.

The technical scheme of the invention is described in detail below in connection with the drawings and specific embodiments. There is provided a method for detecting lens cleanliness using differential flat field correction of the pupil, the method including:

(a) providing a flat-field test light path, the light path including a narrow-band uniform surface light source, the lens to be tested and a monochrome camera that meets the resolution requirements. Camera resolution is the main factor that affects the detection range. It is necessary to determine the monochrome camera that meets the resolution requirement according to the detection accuracy. In this example, the narrow-band uniform surface light source uses an 8-inch monochromatic integrating sphere with a center wavelength of 520 nm and a half-peak width of 20 nm. The lens is mounted onto a V-block tool. The lens is disposed at a large field of view, e.g., 120*120 degrees view angle. The camera is disposed in a manner where the camera's light-sensitive surface is perpendicular to the optical axis of the lens and the camera is translated to a position to detect light through the lens. In this example, the camera uses a pixel size of 5.5 um and a pixel count of 8000*6000, placed at the rear focal plane of the lens;

(b) Placing the pupil in front of the lens to be measured and measuring the bright-field and dark-field image data under the pupil. The bright-field image data is the data obtained when the brightest value at the center of the field of view is 80% to 90% of the saturation value, and the dark-field image data is the data collected when there is no signal input. The measuring step is performed with the exposure time fixed, the brightness of the light source adjusted so that the camera output falls within its range. The image data can then be collected. Different pupil dark-field image data is collected separately to improve data accuracy. In this example, pupil A is a small hole with an aperture of 3 mm. The design pupil position of the lens to be measured is located outside the front face of the lens, and the lens barrel is designed with mounting threads that allow the hole of pupil A to be mounted in the design specified position.

In this example, the camera exposure time is fixed at 50 ms, the integrating sphere is adjusted to output 520 nm monochromatic G light, and the output is adjusted to 0 Nits, i.e., no light output, and the camera acquires images as dark-field image data. When the output is 50 Nits and the integrating sphere is configured to output 520 nm G light, the G light is adjusted such that the camera center Region of Interest (ROI) of 1000*1000 pixels is disposed at an average value of 80% of the maximum range. The camera functions in a 12-bit mode, i.e., the average gray value of about 3300, and the image is collected as bright-field image data.

(c) changing the pupil of the optical system and repeating the placing step to measure the bright-field and dark-field image data under different pupils.

In general, dark-field image data for an optical system is universal. In this scenario which involves switching of the pupil of the optical system, the dark-field image data is measured separately for each pupil switch in order to eliminate potential negative effects. The measurement procedure is similar to that for pupil A. The camera exposure time is fixed at 50 ms. Pupil A is replaced with pupil B which has a hole diameter of 5 mm. The output of the integrating sphere is adjusted and dark-field and bright-field image data are collected. Pupil B is replaced with pupil C which has a hole diameter of 6 mm. The output of the integrating sphere is adjusted and dark-field and bright-field image data are collected;

(d) For each pupil's bright-field image data and dark-field image data, flat-field correction operations are performed.

Calculations for pupil differentials are carried out as follows:

$P_iP_j$ pupil differential=(bright-field image data for pupil $P_i$−dark-field image data for pupil $P_i$)/(bright-field image data for pupil $P_j$−dark-field image data for pupil $D_j$) where $P_i$ and $P_j$ are two different kinds of pupils, i is an index ranging from 1 to N, j is an index ranging from 1 to N and P is the number of pupils. For pupil P1, pupil P2, pupil P3, . . . pupil PN−1, and pupil PN, there are at most $N*(N-1)$ combinations of different pupils as shown in FIG. 3. The results obtained from different pupil combinations vary depending on the physical properties of the impurities, including but not limited to size, three-dimensional shape, transmittance, refractive index, etc. Therefore, traversing various pupil combinations enriches the detection information and improves the judgment efficiency. In this example, six sets of data are obtained for the bright-field and dark-field of each of the three types of pupils in the camera, i.e., each pixel of the camera has six sets of data independent of other pixels, and these data exist in the form of a matrix. For each pixel, a flat-field correction is performed, and the data processing for each pixel is independent of the other pixels. The following six differential operations are obtained:

$AB$ pupil differential=($A$ pupil bright-field image data−dark-field image data)/($B$ pupil bright-field image data−dark-field image data).

$AC$ pupil differential=($A$ pupil bright-field image data−dark-field image data)/($C$ pupil bright-field image data−dark-field image data).

$BA$ pupil differential=($B$ pupil bright-field image data−dark-field image data)/($A$ pupil bright-field image data−dark-field image data).

$BC$ pupil differential=($B$ pupil bright-field image data−dark-field image data)/($C$ pupil bright-field image data−dark-field image data).

$CA$ pupil differential=($C$ pupil bright-field image data−dark-field image data)/($A$ pupil bright-field image data−dark-field image data).

$CB$ pupil differential=($C$ pupil bright-field image data−dark-field image data)/($B$ pupil bright-field image data−dark-field image data).

The resulting matrix of pupil differentials is displayed directly in the form of an image for the determination of lens cleanliness. As can be seen from the differentials, the differential flat field correction results are less affected by the intensity distribution of the image itself, which can suppress the effect of low relative illumination of the large-angle field of view. At a first location, a first data point appears smaller than the surrounding pixels and the image is presented as a dark spot. At a second location, a second data point appears larger than the surrounding pixels and the image is presented as a bright spot. The impurity information is extracted and enlarged in the positive and negative directions. The distribution of the two points of light and dark is shown. There is a uniform pattern of distribution where two positions of the same impurity overlap one another and the edges of the overlap show a clear contrast with an edge-enhancing effect.

During the entire inspection, the optical system does not move, only the pupil size changes. This method is applicable when the pupil position is on the outside of the lens or when there is an adjustable pupil inside the lens.

What is claimed herein is:

1. A method for detecting lens cleanliness of a lens in a flat-field optical path, the flat-field optical path comprises a light source, the lens, a camera, the light source is a narrow-band multispectral uniform surface light source, the camera's light-sensitive surface is disposed perpendicular to an optical axis of the lens and in the light position of the lens and a pupil interposed between the lens and the light source, said method comprising:
   (a) collecting the bright-field image data and dark-field image data for a plurality of pupil aperture sizes through the lens;
   (b) for each pixel, performing a pupil differential flat field correction to yield a plurality of PiPj pupil differentials, wherein a PiPj pupil differential=(pupil Pi bright-field image data−pupil Pi dark-field image data)/(pupil Pj bright-field image data−pupil Pj dark-field image data) and Pi and Pj are two different pupils, i is an index ranging from 1 to N, j is an index ranging from 1 to N and N is the number of pupils; and
   (c) displaying said pupil differentials in the form of a plurality of images to show uniformity of each said image, wherein a non-uniform area on each said image is determined to have been caused by an impurity of the lens.

2. The method of claim 1, wherein:
   (a) said N is 3;
   (b) pupil P1 aperture size is 3 mm;
   (c) pupil P2 aperture size is 5 mm;
   (d) pupil P3 aperture size is 6 mm;
   (e) P1P2 pupil differential=(bright-field image data for pupil P1−dark-field image data for pupil P1)/(bright-field image data for pupil P2−dark-field image data for pupil P2);
   (f) P1P3 pupil differential=(bright-field image data for pupil P1−dark-field image data for pupil P1)/(bright-field image data for pupil P3−dark-field image data for pupil P3);
   (g) P2P1 pupil differential=(bright-field image data for pupil P2−dark-field image data for pupil P2)/(bright-field image data for pupil P1−dark-field image data for pupil P1);
   (h) P2P3 pupil differential=(bright-field image data for pupil P2−dark-field image data for pupil P2)/(bright-field image data for pupil P3−dark-field image data for pupil P3);
   (i) P3P1 pupil differential=(bright-field image data for pupil P3−dark-field image data for pupil P3)/(bright-field image data for pupil P1−dark-field image data for pupil P1); and
   (j) P3P2 pupil differential=(bright-field image data for pupil P3−dark-field image data for pupil P3)/(bright-field image data for pupil P2−dark-field image data for pupil P2).

3. The method of claim 2, wherein said plurality of images comprise six images comprising said P1P2 pupil differential, said P1P3 pupil differential, said P2P1 pupil differential, said P2P3 pupil differential, said P3P1 pupil differential and said P3P2 pupil differential.

* * * * *